United States Patent [19]
Berson et al.

[11] Patent Number: 5,525,798
[45] Date of Patent: Jun. 11, 1996

[54] BAR CODE SCANNER FOR READING A LOWER LAYER LUMINESCENT INVISIBLE INK THAT IS PRINTED BELOW A UPPER LAYER LUMINESCENT INVISIBLE INK

[75] Inventors: William Berson, Weston; Judith D. Auslander, Westport, both of Conn.

[73] Assignee: Pitney Bowes Inc., Stamford, Conn.

[21] Appl. No.: 347,629

[22] Filed: Dec. 1, 1994

[51] Int. Cl.⁶ .............................. G06K 7/12; G06K 7/10
[52] U.S. Cl. .................. 250/271; 235/468; 235/469; 235/491
[58] Field of Search ........................ 250/271; 235/465, 235/468, 469, 491; 283/92

[56] References Cited

U.S. PATENT DOCUMENTS

| | | | |
|---|---|---|---|
| 3,412,245 | 11/1968 | Halverson | 250/271 |
| 3,500,047 | 3/1970 | Berry | 235/468 X |
| 3,582,623 | 6/1971 | Rothery et al. | 235/468 |
| 4,572,803 | 2/1986 | Yamazoe et al. | |
| 4,983,817 | 1/1991 | Dolash et al. | 235/462 |
| 5,367,148 | 11/1994 | Storch et al. | 235/375 |

FOREIGN PATENT DOCUMENTS

| | | |
|---|---|---|
| 0340898 | 11/1989 | European Pat. Off. |
| 488177 | 6/1992 | European Pat. Off. ............... 235/469 |
| 1471367 | 1/1967 | France . |
| B2090194 | 4/1985 | United Kingdom . |
| 8103507 | 12/1981 | WIPO .................................. 283/92 |

OTHER PUBLICATIONS

Abstract Of Japan Patent (JP 63-191,870) To Takuma et al. CA Selects: Coatings, Inks, & Related Products, No. 7, 1989, p. 17.
George Kallistratos "Fluorescent Properties of Aromatic Complexes with Rare Earths and Other Elements of The III α-Group" May 24, 1982 Chimka Chronika, New Series II, 249-266.
Ingmar Grenthe "Stability Relationships Among The Rare Earth Dipicolinates" Jan. 20, 1961, vol. 83, pp. 360-364.

Primary Examiner—Carolyn E. Fields
Assistant Examiner—Edward J. Glick
Attorney, Agent, or Firm—Ronald Reichman; Melvin J. Scolnick

[57] ABSTRACT

Inks have been discovered that are selectively excitable by different wavelengths of incident radiation. This allows a lower layer bar code to be written on an object with an invisible ink and an upper layer bar code to be written over the lower layer bar code with an ink that is invisible to the naked eye. The apparatus of this invention is a detector that is able to read the upper and lower layer bar codes.

8 Claims, 5 Drawing Sheets

5,525,798

BAR CODE SCANNER FOR READING A LOWER LAYER LUMINESCENT INVISIBLE INK THAT IS PRINTED BELOW A UPPER LAYER LUMINESCENT INVISIBLE INK

CROSS REFERENCE TO RELATED APPLICATIONS

Reference is made to commonly assigned copending patent application Ser. No. 08/347,740, filed herewith entitled "Bar Code Using Luminescent Invisible Inks" in the names of Judith Auslander and William Berson, Ser. No. 08/347,631 filed herewith entitled "Bar Code Scanner for Reading A Visible Ink And A Luminescent Invisible Ink" in the names of William Berson and Judith Auslander, and Ser. No. 08/348,014 filed herewith entitled "Bar Code Printing And Scanning System Utilizing Invisible Wax Based Fluorescent Inks" in the names of Judith Auslander And William Berson. .

FIELD OF THE INVENTION

The invention relates generally to the field of electronic circuits and more particularly to a bar code scanner for reading bar codes printed with different Invisible Inks.

BACKGROUND OF THE INVENTION

Bar codes have been used in a wide variety of applications as a source for information. Typically bar codes are used at a point-of-sale terminal in merchandising for pricing and inventory control. Bar codes are also used in controlling personnel access systems, mailing systems, and in manufacturing for work-in process and inventory control systems, etc. The bar codes themselves represent alphanumeric characters by series of adjacent stripes of various widths, i.e. the universal product code.

A bar code is a set of binary numbers. It consists of black bars and white spaces. A wide black bar space signifies a one and a thin black bar or space signifies a zero. The binary numbers stand for decimal numbers or letters. There are several different kinds of bar codes. In each one, a number, letter or other character is formed by a certain number or bars and spaces.

Bar code reading systems or scanners have been developed to read bar codes. The bar code may be read by having a light beam translated across the bar code and a portion of the light illuminating the bar code is reflected and collected by a scanner. The intensity of the reflected light is proportional to the reflectance of the area illuminated by the light beam. Thus, the scanners read the difference between the light and dark bars by reading the absences of reflected light. This light is converted into an electric current signal and then the signal is decoded.

Conventional bar codes are limited in the amount of information they contain. Even two dimensional bar codes such as PDF-417 and Code-1 are limited to a few thousand bytes of information. The ability to encode greater information density is limited by the resolution of available scanning devices.

The prior art has attempted to use colored bar codes to convey additional information. However, color printing is inherently analog and the is fastness, reproducibility and selective delectability of colored bar code imprints as well as the impractically of reproducibly calibrating detection systems, prohibit their use for the digital encoding of additional information.

Bar codes have been affixed to many different types of documents, so that they may be read by a machine, thereby reducing labor costs. Documents that include bar codes have been issued by governmental agencies, financial institutions, brokerage houses, etc., that authorize the holder of such documents to perform authorized tasks or grant rights to the holder of such a document. Examples of such documents are drivers licenses, entry access badges, identification cards, etc. In issuing such documents, it is desirable to have them of a convenient size, while including information necessary for identifying the holder of the document and the rights conferred. Thus, oftentimes, there is not enough room to include the bar code with all of the information one would want to include in the bar code.

Another problem encountered by the prior art when bar codes were affixed to documents is that the bar codes were not to difficult to forge and could be easily copied, hence there was unauthorized use of the documents to which the bar codes were affixed.

SUMMARY OF THE INVENTION

This invention overcomes the disadvantages of the prior art by providing a bar code scanner that reads a bar code that provides more information than conventional bar codes. The bar code scanner also reads two bar codes that are more difficult to counterfeit than conventional bar codes. A lower layer bar code is printed on an object and an upper layer bar code is printed over the lower layer bar code. The lower layer bar code is printed with a luminescent ink that is invisible to the naked eye and the upper layer bar code is printed with a luminescent ink that is invisible to the naked eye. The bar code scanner emits light having short UV wavelengths between 340 and 400 nm that excites the lower layer luminescent ink. A portion of the light that excited the lower layer luminescent ink is converted into a luminescent signal. This can be obtained by using a class of dyes called fluorescent whitning agents. The aforementioned dyes are based on stilbene compounds. They absorb light in the near uv region and the emission occurs at short visible wavelengths 400–500 nm giving additional violet blue light to the reflected light. Examples of the above dyes are: CI fluorescence brightner 48, CI fluorescence brightner 32, CI fluorescence brightner 300 etc. All of the above compounds are soluble in water. the above are invisible. The emission wavelength of the converted signal will be between 440 and 500 nm. The bar code scanner also emits light having short and long UV wavelengths between 230 and 330 nm that excites on the upper layer luminescent ink. A portion of the light that impinges on the upper layer luminescent ink is converted into a luminescent signal. The emission wavelength of the converted signal will be between 480 and 1800 nm. Thus, the scanner detector reads the bar coded print elements rather than the spaces between them.

The apparatus of this invention detects the emission of light rather than the absence of reflected light. It is easier to detect an emitter than a dark space. Hence, an advantage of this invention is that the detection of bar codes is easier.

The invisible inks used are based on complexes of rare earth elements with an atomic number higher than 57 such as: Eu, Tb, Sm, Dy, Lu, Ln, Gd with various chelating agents providing chromophore ligands that absorb in the ultraviolet and the blue region of the spectra such as: β diketones, dipicolinic acid etc. The luminescent emission in these complexes is due to inner transitions such as: $^5D_0 \rightarrow {}^7F_1$ and $^5D_0 \rightarrow {}^7F_2$ for Europium. All of the above chelates of rare earth metals show a strong ultraviolet absorption in the ultraviolet region of the spectra. Through an internal conversion and systems interference part of this energy is transferred to the rare earth ion which is excited to the electron level of luminescence. The emission of he rare earth ions occurs at very narrow bands of <10 nm.

DETAILED DESCRIPTION OF THE PREFERRED EMBODIMENT

Figure 1:
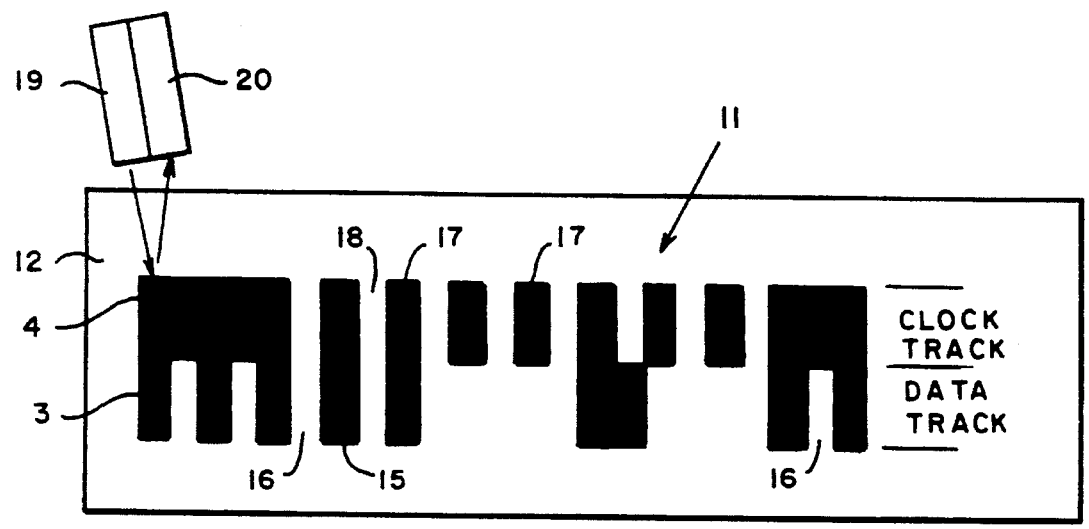
FIG. 1 is a drawing of a bar code that was utilized by the prior art.

In order to better understand that which separates this invention from the prior art consider the following. Refer to the drawings in detail, and more particularly to FIG. 1 a prior art bar code 11 is printed on an object 12. Bar code 11 has a data track 13 and a clock track 14. A black bar 15 would indicate a binary one in the data track and a white space 16 would indicate a zero in the data track. A black bar 17 would indicate a binary one in the clock track and a white space 18 would indicate a binary zero in the clock track.

The information contained in bar code 11 is illuminated by light source 19, reflected by bar code 11 and read by scanner 20.

Thus, FIG. 1 illustrates the amount of information that may be contained in a prior art black and white bar code.

Figure 2:
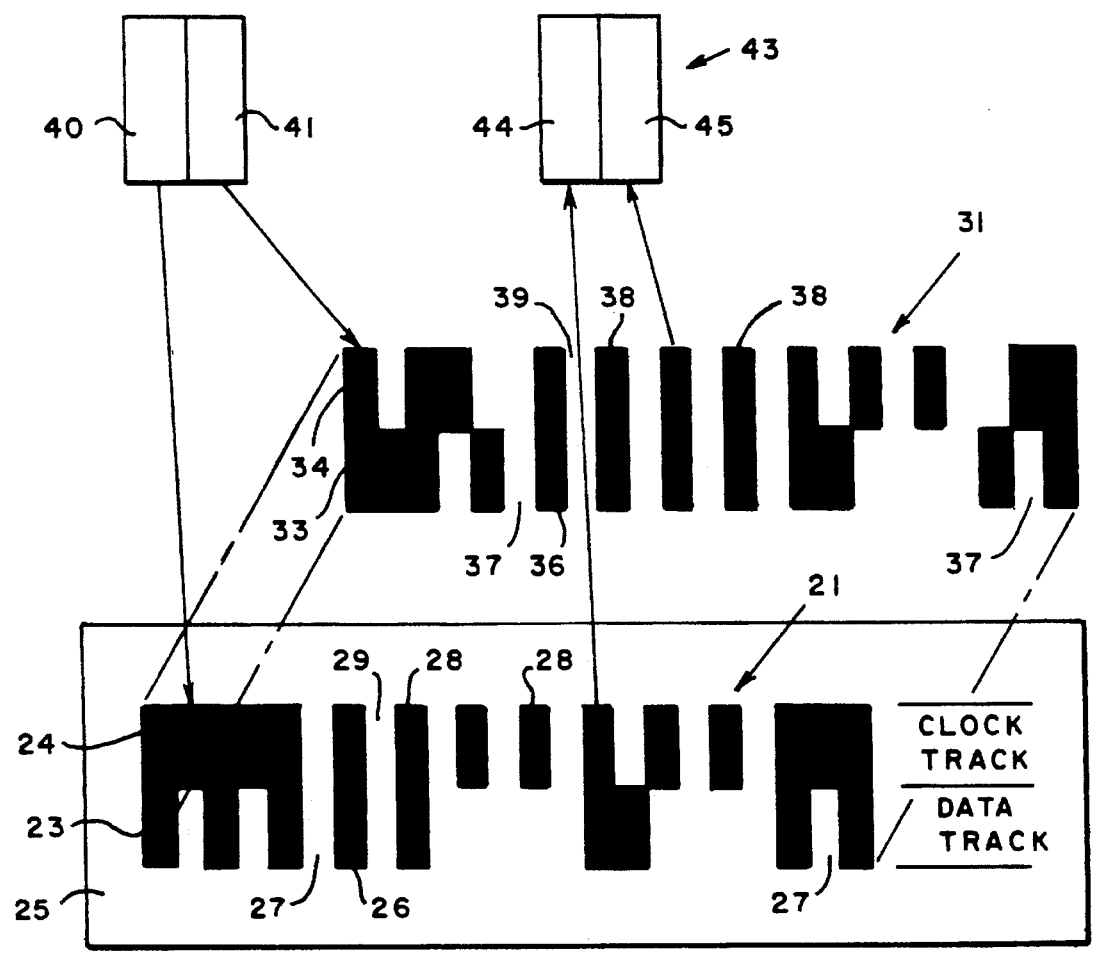
FIG. 2 is a drawing of bar codes that may be read by the apparatus of this invention.

FIG. 2 is a drawing of the bar code of this invention. Lower layer bar code 21 has a data track 23 and a clock track 24. Lower layer bar code 21 is printed on object 25 with an invisible ink. Object 25 is any surface known in the art in which inks may be printed on i.e.; paper, envelopes, cardboard, plastic, etc. A dark bar 26 or space containing ink would indicate a binary one in the data track and a white space 27 or space containing no ink would is indicate a zero in the data track. A dark bar 28 or space containing ink would indicate a binary one in the clock track and a white space 29 or space containing no ink would indicate a binary zero in the clock track.

An upper layer bar code 31 is printed over lower layer bar code 21. Bar code 31 is printed with an invisible ink. Bar code 31 has a data tract 33 and a clock track 34. A dark bar 36 or space containing ink would indicate a binary one in the data track and an empty space 37 or space containing no ink would indicate a zero in the data track. A dark bar 38 or space containing ink would indicate a binary one in the clock track and an empty space or space containing no ink would indicate a binary zero in the clock track.

Thus, in the same amount of space on object 25, that would be utilized by the prior art to print one bar code, this invention prints two or more bar codes. Hence, more than double the amount of information may be printed in the same space.

Figure 6:
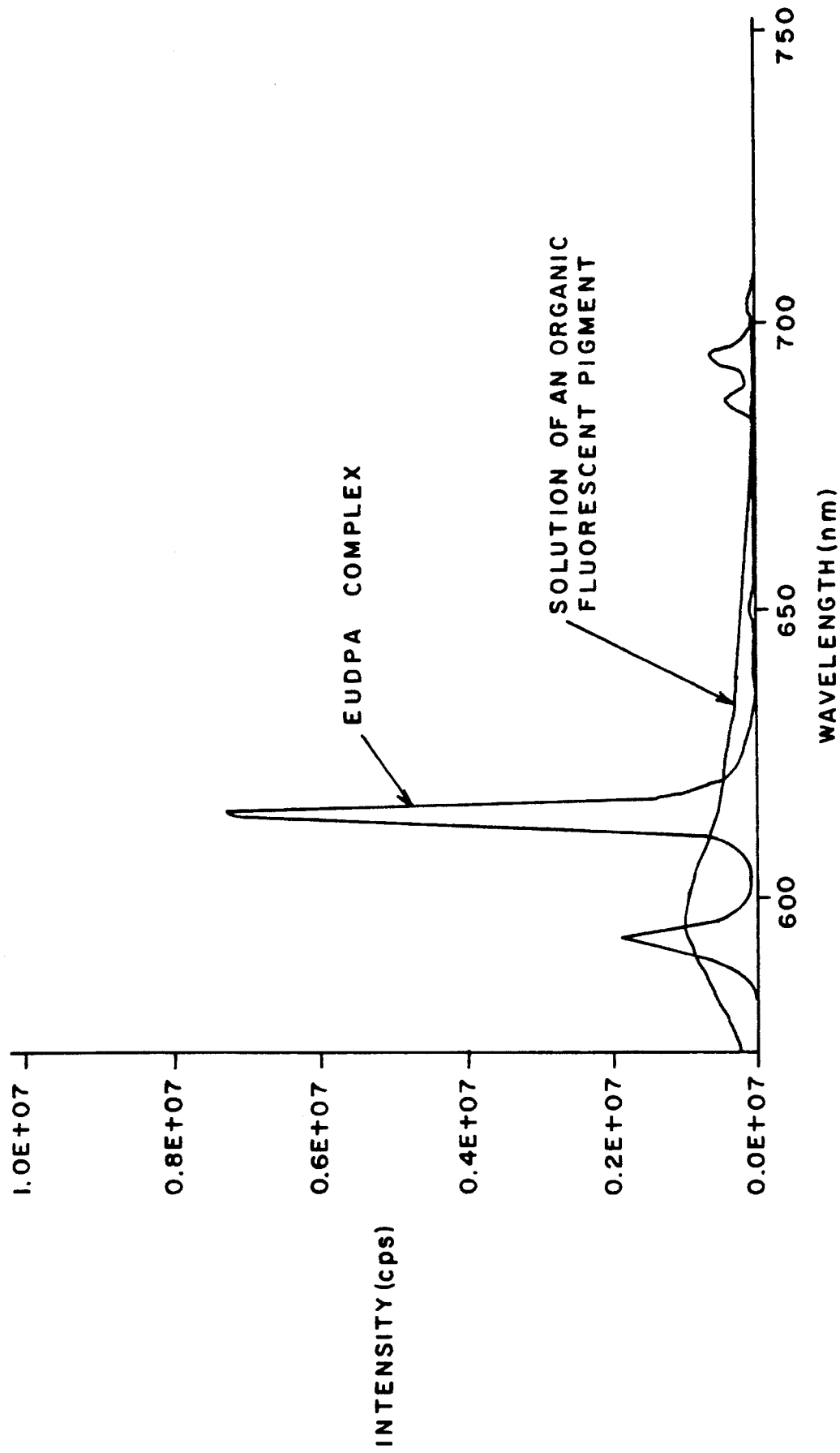
FIG. 6 is a graph of the fluorescence of an EuDPA complex and a solution of an organic fluorescent pigment.

The inks that are used to print bar codes 21 and 31 may be applied using conventional printing methods i.e. ink jet, impact, dot matrix etc. The inks used to print bar codes 21 and 31 are based on various emission wavelengths and on similar excitation. The emission of the inks to print bar codes 21 and 31 are different due to the various combination of the lanthanide complexes and organic dyes from the optical brightner class. The lanthonide complexes emit narrow bands between 490–1800 nm. They are discrete as shown in FIG. 6 and therefore they can be detected and identified without mutual interaction. The ink that is used to print bar code 31 is invisible to the naked eye and is based on organic complexes of lanthanides, rare earth elements, such as: terbium, gadolinium and terbium dipicolinates. The above complex may be prepared from a salt of dipicolinic acid (DPA) and a rare earth element in an aqueous medium. As is known in the art, so-called rare earth metals generally consist of elements with atomic numbers 58 through 71, and include, e.g., cerium, erbium, europium, gadolinium, lutetium, scandium, terbium and ytterbium. The terbium complex of the invention, e.g., a tris (dipicolinato)-terbium (III) complex, has a suitable decay time, is transparent in the visible region of the spectrum, and is soluble in known carriers, such as varnishes. The europium product, i.e., a tris(dipicolinato)-europium (III) complex, produces a signal in another portion of the visible spectrum at the proper location for the processing of indicia produced by meter machines. The lanthanide complex has discrete excitation wavelength at 254 nm due to the transition of the atomic energy levels (4d to 5f). The emission wavelength is for europium at 600 nm and for terbium at 550 nm.

Examples of inks used that are used to print bar code 21 is as follows:

EXAMPLE 1

Prepare a solution 4,4'-diamnio, 2,2'stilbenedisulphonic acid or of 4% CI brightner solution 34 (manufactured by Dupont) in water DEG solution at a ratio of 4 parts CI brightner to onepart water. Prepare a draw down of the above solution on a howard bond paper by excitation at 360 nm. An emission of 480 nm is obtained.

EXAMPLE 2

Prepare a solution of leucophor u (manufactured by Byer) in a solution of water in 2'pyrrolidone 5 to 1. Prepare a draw down of the above solution on a howard bond paper by excitation at 380 nm. An emission of 480 nm is obtained.

Examples of inks that are used to print bar code 31 is as follows:

EXAMPLE 1

Dissolve 16.88 gms of sodium hydroxide in 250 ml deionized water. To the above solution add 35.26 gms of DPA and stirr. overnight. Then add 1.5 gms to the previous solution to disolve the excess DPA. The ph of the above solution is 13.05. the solution is rhen mixed for 1.5 hours and half of the solution is filtered. An aqueous solution of $Eu(NO_3)_5(H_2O)_5$ was prepared by adding 7.5 gms of $Eu(NO_3)_5(H_2O)_5$ to 25 ml of water. To the filtered solution of DPA was added $Eu(NO_3)_5(H_2O)_5$ solution in 5 ml increments while stirring. A white percipitate formed. Twenty percent of $HNO_3$ was added until the final ph of the solution was 250 ml. The resultant solution was clear and colorless. To the colorless solution 10% of 2'pyrrolidone was added as a humectant. The final solution was bottled and refrigerated.

A draw down of the above solution was made on a howard bond paper and the resultant fluorescence was measured with a phosphor meter. The resultant reading was 180 phosphor meter units. The fluorescent emission of the sample was measured with a LSS spectraphotometer and the results are shown in FIG. 6.

EXAMPLE 2

Dissolve 16.88 gms of sodium hydroxide in 250 ml deionized water. To the above solution add 35.26 gms of DPA and stirr overnight. Then add 1.5 gms to the previous solution to disolve the excess DPA. The ph of the above solution is 13.05. The solution is then mixed for 1.5 hours and half of the solution is filtered. An aqueous solution of $Tb(NO_3)_5(H_2O)_5$ was prepared by adding 7.5 gms of $Tb(NO_3)_5(H_2O)_5$ to 25 ml of water. To the filtered solution of DPA was added $Eu(NO_3)_5(H_2O)_5$ solution in 5 ml increments while stirring. A white percipitate formed. Twenty percent of $HNO_3$ was added until the final ph of the solution was 250 ml. The resultant solution was clear and colorless. To the colorless solution 10% of 2'pyrrolidone was added as a humectant. The final solution was bottled and refrigerated.

At the excitation of 280 nm an emission spectra was obtained with a fluorescence spectraphotometer Perkin Elmer LS-5 and the maximum wavelength of emission was 550 nm.

EXAMPLE 3

Dissolve 16.88 gms of sodium hydroxide in 250 ml deionized water. To the above solution add 35.26 gms of DPA and stirr. overnight. Then add 1.5 gms to the previous solution to disolve the excess DPA. The ph of the above solution is 13.05. the solution is rhen mixed for 1.5 hours and half of the solution is filtered. An aqueous solution of $Dy(NO_3)_5(H_2O)_5$ was prepared by adding 7.5 gms of $Dy(NO_3)_5(H_2O)_5$ to 25 ml of water. To the filtered solution of DPA was added $Dy(NO_3)_5(H_2O)_5$ solution in 5 ml increments while stirring. A white percipitate formed. Twenty percent of $HNO_3$ was added until the final ph of the solution was 250 ml. The resultant solution was clear and colorless. To the colorless solution 7% of N-Methyl pynolidone was added as a humectant. The final solution was bottled and refigerated.

At the excitation of 280 nm an emission spectra was obtained with a fluorescence spectraphotometer Perkin Elmer LS-5 with the maximum wavelength of emission at 500 nm.

EXAMPLE 4

Dissolve 16.88 gms of sodium hydroxide in 250 ml deionized water. To the above solution add 35.26 gms of DPA and stirr overnight. Then add 1.5 gms to the previous solution to disolve the excess DPA. The ph of the above solution is 13.05. The solution is then mixed for 1.5 hours and half of the solution is filtered. An aqueous solution of $Nd(NO_3)_5(H_2O)_5$ was prepared by adding 7.5 gms of $Nd(NO_3)_5(H_2O)_5$ to 25 ml of water. To the filtered solution of DPA was added $Nd(NO_3)_5(H_2O)_5$ solution in 5 ml increments while stirring. A white percipitate formed. Twenty percent of $HNO_3$ was added until the final ph of the solution was 250 ml. The resultant solution was clear and colorless. To the colorless solution 10% of 2'pyrrolidone was added as a humectant. The final solution was bottled and refigerated.

At the excitation of 280 nm an emission spectra was obtained with a fluorescence spectraphotometer Perkin Elmer LS-5 with the maximum wavelength of emission at 1060 nm.

The information contained in bar codes 21 and 31 may be excited by source 40 and source 41. Excitation source 40 has a wavelength between 350 and 400 nm and source 41 has a wavelength between 240 and 330 nm. Bar code 21 will emit light between 400 and 500 nm and bar 31 will emit light between 500 and 1800 nm. Detector 43 comprise a detector 44 and a detector 45. Detector 44 is utilized to sense the light emitted form bar code 21 and detector 45 is utilized to sense the light emitted for bar code 31.

Figure 3:
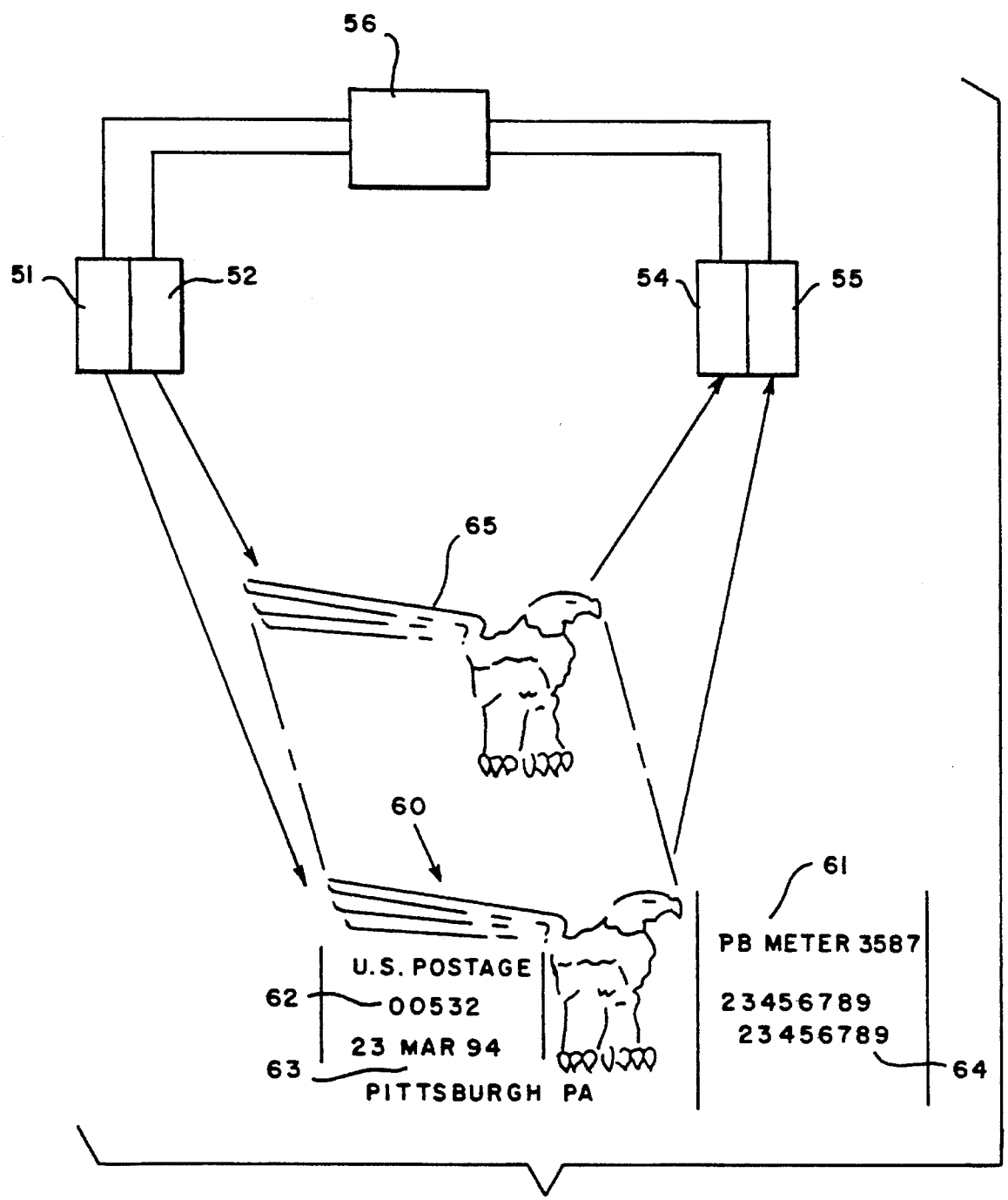
FIG. 3 is a drawing of an alternate embodiment of this invention in which an indicia is printed on an object with a first invisible ink and an indicia is printed above the object with a second invisible ink.
Figure 4:
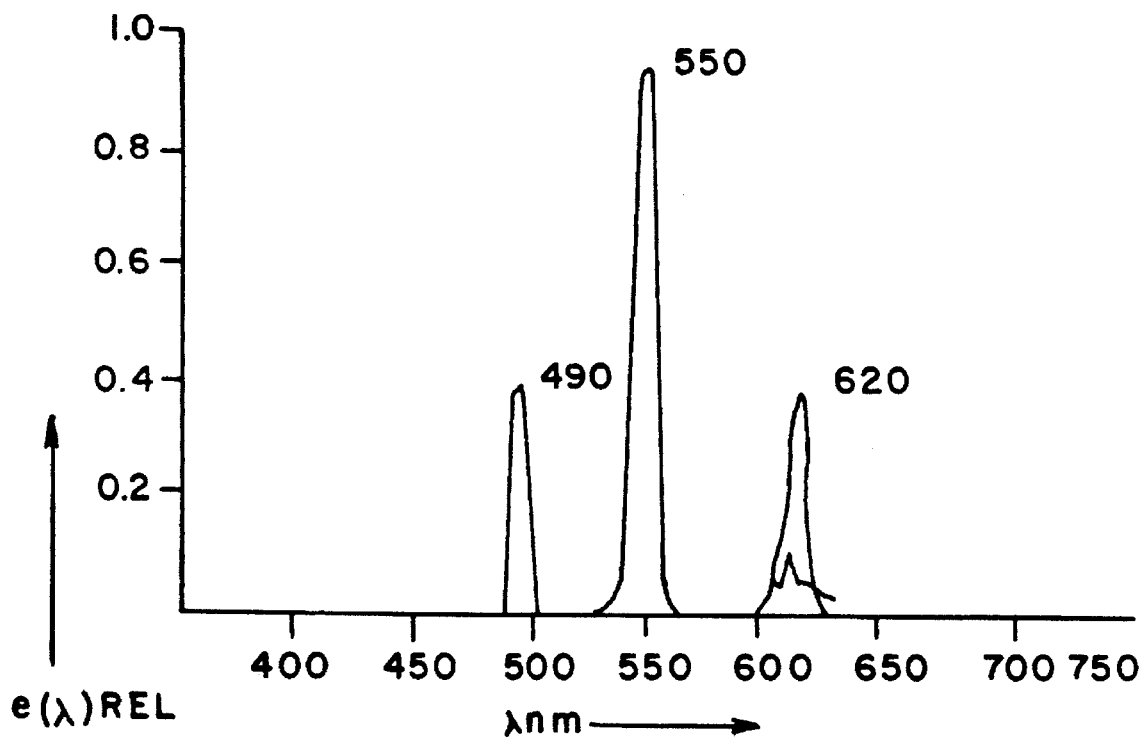
FIG. 4 is a graph of the fluorescence of three rare earth elements.
Figure 5:
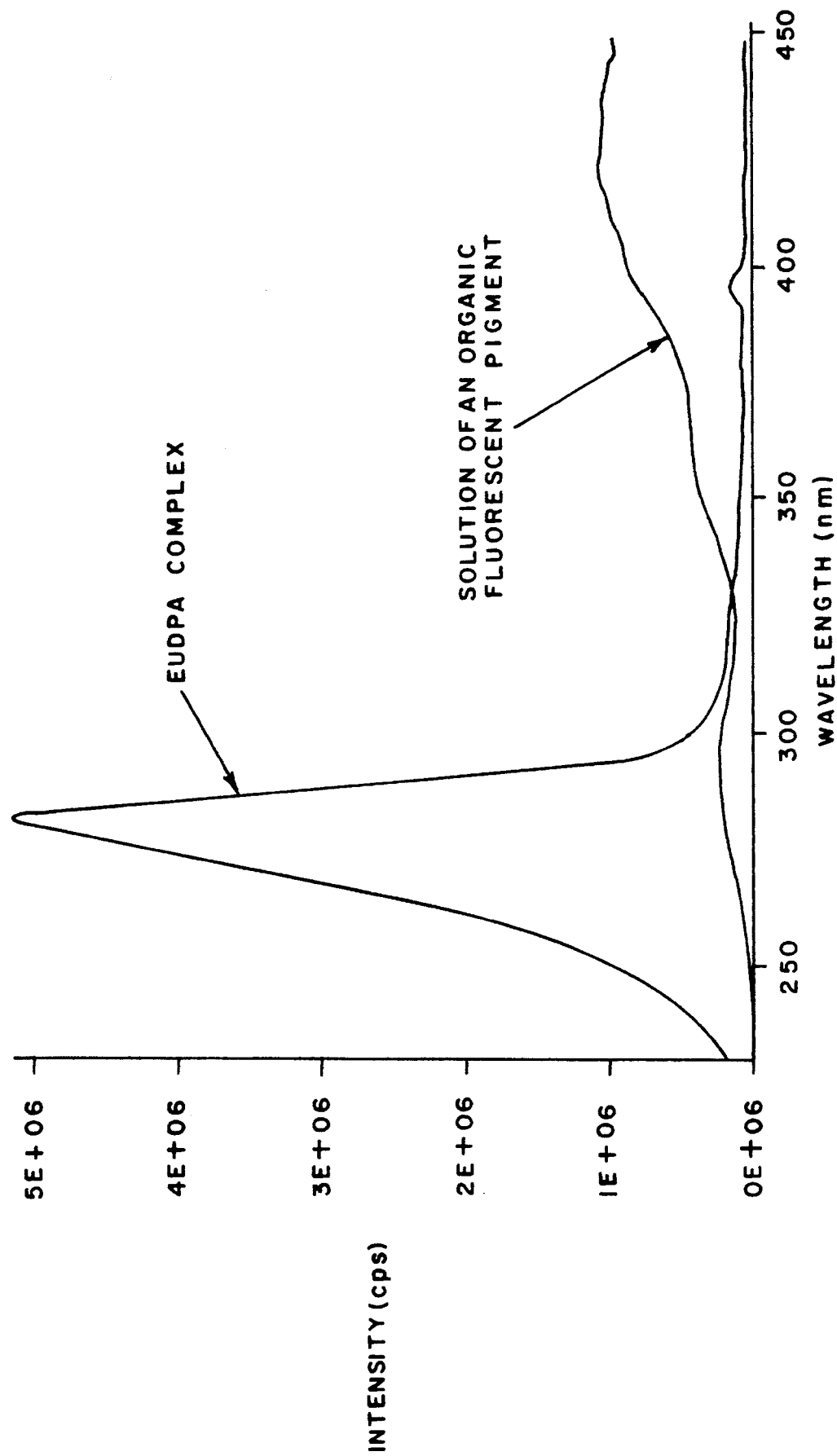
FIG. 5 is a graph of the excitation of the EuDPA complex and a solution or organic fluorescent pigment.

FIG. 3 is a drawing of an alternate embodiment of this invention in which lower layer indicia is printed on an object with a first invisible ink and a upper layer indicia is printed above the lower layer-indicia with a second invisible ink. The first and second invisible inks are similar to the invisible inks described in the description of FIG. 2. The indicia described is a postal indicia. However, any other indicia may be utilized. The document 60 will have a lower layer indicia that contains a dollar amount 62, the date the indicia was affixed to the mail piece 63, and the postal meter serial number 61. In addition, the document 60 will include a validation number 64.

A upper layer indicia 65 similar to the lower layer indicia is printed over the lower layer indicia with an invisible ink. Only the eagle portion of the lower layer comprises indicia 65.

The information contained in the lower layer indicia may be read by utilizing light source 51. Light source 51 has a wavelength between 350 and 400 nm. Detector 54 senses the emitted light from the lower layer indicia. The information contained in indicia 65 may be read by utilizing ultra violet light source 52. Ultra violet light source 52 emits light having a wavelength between $240 \geq 330$ nm. Detector 45 senses the emitted light from indicia 65. Detector 65 may be a photo diode or photo transistor.

If light source 51 and 52 and detector 54 and 55 are periodically turned on and off approximately 16 times a second by switching mechanism 56, the eagle portion of the indicia will look like it is moving.

The above specification describes a new and improved apparatus reading bar codes that are printed with luminescent invisible inks. It is realized that the above description may indicate to those skilled in the art additional ways in which the principles of this invention may be used without departing from the spirit. It is, therefore, intended that this invention be limited only by the scope of the appended claims.

What is claimed is:

1. A system for sequentially reading indicia, said system comprises:

means for reading a first indicia that is printed on an object with a first luminescent ink that is invisible to the human eye;

means for reading a second indicia that is placed on top of the first indicia, said second indicia, is similar in appearance to said first indicia but differs from said first indicia, said second indicia is made of a second luminescent ink that is invisible to the human eye; and means for switching from said first reading means to said second reading means so that said first and second indicia or a portion of said first and second indicia appear to a human observer viewing said first and second indicia to move.

2. The system claimed in claim 1, wherein said first reading means comprises:

a first light source that emits incident light that is impinges on the on the first indicia; and a first detector that detects the light that is emitted by the first luminescent ink.

3. The system claimed in claim 2, wherein said first light source emits light having a wavelength of 350–400 nm.

4. The system claimed in claim 2 wherein said first detector detects light having a wavelength of 400–500 nm.

5. The system claimed in claim 2, wherein said second reading means comprises:

a second light source that emits light that impinges on the second luminescent ink; and a second detector that detects the light is emitted by the second luminescent ink in order to read said second indicia.

6. The system claimed in claim 5 wherein said second detector is a photo diode or photo transistor.

7. The system claimed in claim 5, wherein said second light source emits light having a wavelength of 400 nm.

8. The second detector claimed in claim 5, wherein said second detector detects light having wavelengths of 620 nm.

* * * * *